US011907956B2

(12) United States Patent
Sanghvi et al.

(10) Patent No.: US 11,907,956 B2
(45) Date of Patent: Feb. 20, 2024

(54) SYSTEMS AND METHODS FOR AUTOMATED NOTIFICATION AND RESOLUTION OF TRIGGER EVENTS

(71) Applicant: JPMORGAN CHASE BANK, N.A., New York, NY (US)

(72) Inventors: Hetal Sanghvi, Mumbai (IN); Tejal Vora, Mumbai (IN); Candice Noronha, Mumbai (IN); Vinesh Mehta, Mumbai (IN); Ismail Tinwala, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 13 days.

(21) Appl. No.: 17/643,164

(22) Filed: Dec. 7, 2021

(65) Prior Publication Data

US 2023/0045860 A1 Feb. 16, 2023

(30) Foreign Application Priority Data

Aug. 11, 2021 (IN) .............................. 202111036282

(51) Int. Cl.
*G06Q 20/40* (2012.01)
*G06F 9/54* (2006.01)

(52) U.S. Cl.
CPC ......... *G06Q 20/4016* (2013.01); *G06F 9/542* (2013.01)

(58) Field of Classification Search
None
See application file for complete search history.

(56) References Cited

U.S. PATENT DOCUMENTS

| 2010/0241535 A1* | 9/2010 | Nightengale | G06Q 40/02 705/30 |
| 2010/0274691 A1* | 10/2010 | Hammad | G06Q 20/3221 705/30 |
| 2014/0282040 A1* | 9/2014 | Alfaro | G06F 3/04847 715/739 |

* cited by examiner

Primary Examiner — Syed A Roni
(74) Attorney, Agent, or Firm — GREENBERG TRAURIG LLP

(57) ABSTRACT

Systems and methods for automated notification and resolution of trigger events are disclosed. According to one embodiment, a method for automated notification and resolution of trigger events may include: (1) monitoring, by a backend computer program, an account for a trigger condition; (2) generating, by the backend computer program, a voice notification for the trigger condition; (3) communicating, by the backend computer program, the voice notification to an electronic device associated with the account and a link to a network location to resolve the trigger condition; (4) presenting, by the backend computer program and at the network location to resolve the trigger condition, one or more resolution options; (5) receiving, by the backend computer program and at the network location to resolve the trigger condition, a selection of one of the one or more resolution options; and (6) executing, by the backend computer program, the selected resolution option.

16 Claims, 3 Drawing Sheets

SYSTEMS AND METHODS FOR AUTOMATED NOTIFICATION AND RESOLUTION OF TRIGGER EVENTS

BACKGROUND OF THE INVENTION

1. Field of the Invention

Embodiments relate to systems and methods for automated notification and resolution of trigger events.

2. Description of the Related Art

Individuals holding accounts with a provider often need to invest time and effort to take an action with that account. If the individual is travelling or on vacation, an urgent matter will require the individual to attend to that need.

SUMMARY OF THE INVENTION

Systems and methods for automated notification and resolution of trigger events are disclosed. According to one embodiment, a method for automated notification and resolution of trigger events may include: (1) monitoring, by a backend computer program, an account for a trigger condition; (2) generating, by the backend computer program, a voice notification for the trigger condition; (3) communicating, by the backend computer program, the voice notification to an electronic device associated with the account and a link to a network location to resolve the trigger condition; (4) presenting, by the backend computer program and at the network location to resolve the trigger condition, one or more resolution options; (5) receiving, by the backend computer program and at the network location to resolve the trigger condition, a selection of one of the one or more resolution options; and (6) executing, by the backend computer program, the selected resolution option.

In one embodiment, the trigger condition may include an account balance falling below a threshold a potential fraud event, an authentication event, a key performance indicator breach, a disposition of a sanctions hit, etc.

In one embodiment, the voice notification may be provided as a second link, an in-application notification, etc.

In one embodiment, the backend computer program may receive the selected resolution option as a voice-based command or a gesture-based command.

In one embodiment, the method may further include authenticating, by the backend computer program, a user associated with the account.

According to another embodiment, an electronic device may include a computer processor; and a memory having stored therein a backend computer program. The backend computer program may be configured to: monitor an account for a trigger condition; the backend computer program may be configured to generate a voice notification for the trigger condition; communicate the voice notification to an electronic device associated with the account and a link to a network location to resolve the trigger condition; present, at the network location, one or more resolution options; receive, at the network location, a selection of one of the one or more resolution options; and execute the selected resolution option.

In one embodiment, the trigger condition may include an account balance falling below a threshold a potential fraud event, or an authentication event, a key performance indicator breach, a disposition of a sanctions hit, etc.

In one embodiment, the voice notification may be provided as a second link, as an in-application notification, etc.

In one embodiment, the selected resolution option may be received as a voice-based command or a gesture-based command.

In one embodiment, the backend computer program may be further configured to authenticate a user associated with the account.

According to another embodiment, a mobile electronic device may include a computer processor, and a memory having stored therein a mobile electronic device computer program. The mobile electronic device program may be configured to: receive, from a backend computer program and over a computer network, an electronic notification comprising a voice notification of a trigger condition and a link to a network location to resolve the trigger condition, wherein the backend computer program may be configured to present, at the network location, one or more resolution options; establish a data connection with the network location; and enter a selection of one of the one or more resolution options at the network location; wherein the backend computer program may be configured to execute the selected resolution option.

In one embodiment, the trigger condition may include an account balance falling below a threshold a potential fraud event, an authentication event, or breach of a key performance indicator.

In one embodiment, the voice notification may be received as a second link, as an in-application notification, etc.

According to another embodiment, a method for automated notification and resolution of trigger events may include: (1) receiving, by mobile electronic device program and from a backend computer program, an electronic notification comprising a voice notification of a trigger condition and a link to a network location to resolve the trigger condition, wherein the backend computer program is configured to present, at the network location, one or more resolution options; (2) establishing, by the mobile electronic device program, a data connection with the network location; and (3) entering, by the mobile electronic device program, a selection of one of the one or more resolution options at the network location. The backend computer program is configured to execute the selected resolution option.

In one embodiment, the trigger condition may include an account balance falling below a threshold a potential fraud event, an authentication event, or breach of a key performance indicator.

In one embodiment, the voice notification may be received as a second link.

In one embodiment, the voice notification may be received as an in-application notification.

In one embodiment, the trigger condition may include an account balance falling below a threshold a potential fraud event, or an authentication event.

In one embodiment, the trigger condition may include a key performance indicator breach.

In one embodiment, the trigger condition may include a disposition of a sanctions hit.

BRIEF DESCRIPTION OF THE DRAWINGS

In order to facilitate a fuller understanding of the present invention, reference is now made to the attached drawings.

The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Embodiments are generally directed to a mobile computer application that may provide at least some of the following: (1) transaction authorization (e.g., permit transaction authorization for all payment types through mobile by logging to the app or by way of clicking a link for transaction specific authorization); short messaging service (SMS) alerts (e.g., alerts may be provided by SMS transaction status, returns, interest, fees, etc.); transaction link (e.g., provide a link of transaction for approval/release as part of SMS or email); sanctions (e.g., dispose of a sanctions hit where additional details may be provided via the mobile application or SMS reply); fraud alerts (e.g. provide a SMS link to verify/confirm a transaction that will get released when client validates); validation/authentication (e.g., perform validation of the SMS or other means using biometrics, such as voice recognition, retina identification, etc.); funding alerts (e.g., automatically send a notification when transactions are held for want of funds); virtual assistant (e.g., virtual assistant uses voice queries, gesture based controls, a natural-language user interface, etc. to answer questions, generate reports, provide recommendations and trigger back end commands); training materials (e.g., provide training materials, such as videos and interactive tools, to provide in-person training experience); data analytics (e.g., provide insights, including volumes, value, balances, repairs, etc. and an alert mechanism that can trigger an email/SMS in event of threshold breach); etc.

Embodiments may be agnostic to the presence of a data connection. For example, the user electronic device may receive a notification when a data connection is available and may respond when a data connection is available. The backend may execute the user's selection when it is received. Thus, a constant data connection is not required.

Figure 1:
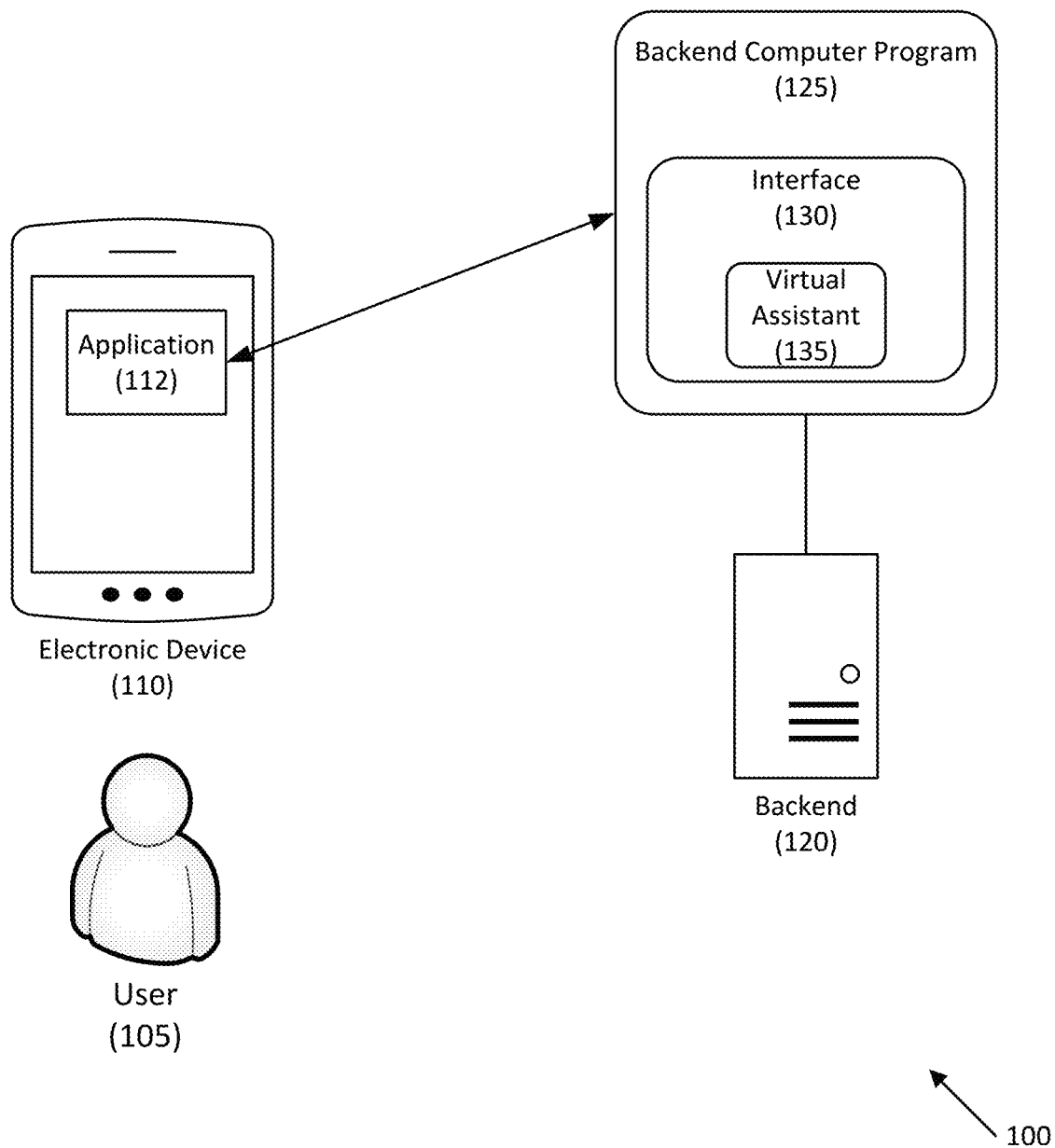
FIG. 1 illustrates a system for automated notification and resolution of trigger events according to one embodiment.

Referring to FIG. 1, a system for automated notification and resolution of trigger events is disclosed according to an embodiment. System 100 may include electronic device 110 which may be any suitable electronic device, such as a smartphone, a tablet computer, a desktop computer, an Internet of Things (IoT) device, etc. Electronic device 110 may execute application or program 112, which may be an application or program that may access an interface provided by backend 120.

In one embodiment, application or program 112 may be a browser.

In one embodiment, application or program 112 may be part of an application or program provided by an entity with which user 105 may have an account, such as a financial institution.

In one embodiment, user 105 may be a customer.

System 100 may further include backend 120, which may be a physical backend and/or cloud-based backend. In one embodiment, backend 120 may be associated with an entity with which user 105 may have an account, such as a financial institution.

Backend 120 may execute backend computer program 125 that may monitor the account for user 105 for trigger events, such as low balances, potential fraud, additional authentication events, etc.

Backend 120 may further provide interface 130, which may be an interface to which application or program 112 may access or browse. In one embodiment, interface 130 may be provided at a web address.

Interface 130 may include a chat, both manual and automated, with sound enabled. Interface 130 may provide options for user 105 to investigate and/or resolve the trigger event. It may further provide functionality for user 105 to process a transaction remotely, provide authentication, generate reports, etc. In one embodiment, the chat may be provided by virtual assistant 135. Virtual assistant 135 may interact with user 105 using voice-based commands, gesture-based commands, etc. In embodiments, virtual assistant 135 may validate voice-based and/or gesture-based commands validated before being executed.

In one embodiment, virtual assistant 135 may be provided by backend 120.

Figure 2:
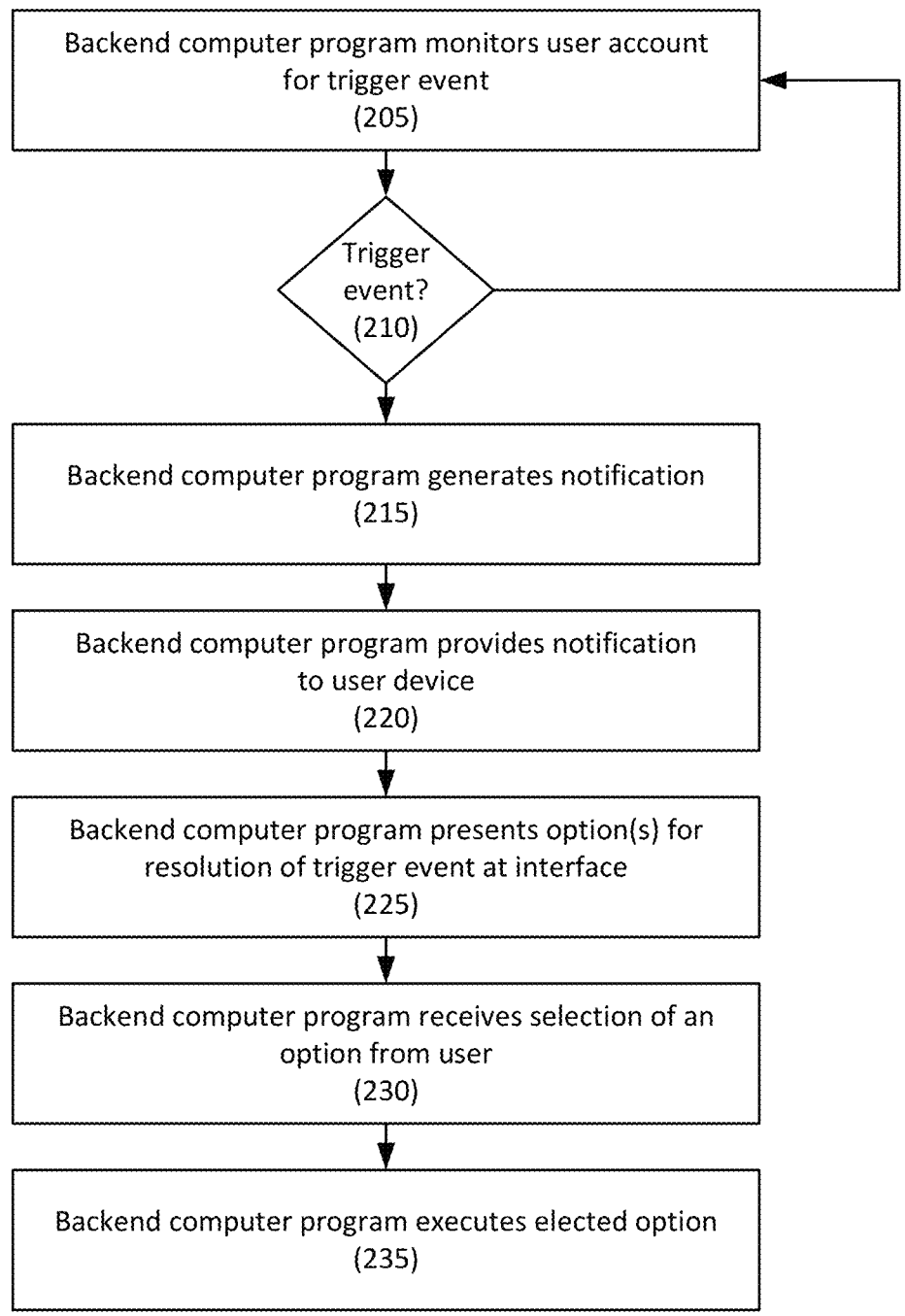
FIG. 2 depicts a method for automated notification and resolution of trigger events according to one embodiment.

Referring to FIG. 2, a method for automated notification and resolution of trigger events is disclosed according to an embodiment. In step 205, a backend computer program may monitor one or more user accounts for a trigger condition. A trigger condition may be any occurrence that requires user attention, such as a financial account balance falling below a predetermined threshold, a fraud alert, an authentication event, a disposition of the sanctions hit, a key performance indicator (KPI) breach, a variance in a metric versus a prior month, etc.

If, in step 210, a trigger event is detected, in step 215, the backend computer program may generate a notification for the trigger event. In one embodiment, the notification may include a voice notification, such as "We detected a low balance in your account" or "We detected a potential fraud event involving your credit card ending in 1234." Any suitable form of notification may be provided as is necessary and/or desired.

In step 220, the backend computer program may communicate the notification to the user's electronic device. In one embodiment, notification may include the voice notification or a link to the voice notification, and a link to a network location to resolve the trigger event. For example, the voice notification may be stored at a network location, and the link provided to the user's electronic device may point to the network location.

In another embodiment, the notification may be an in-app notification provided to an application executed by the user's electronic device.

In one embodiment, the link to retrieve the voice notification and the link to the interface may be the same link.

In step 225, at the interface linked in the notification, such as a network location, the backend computer program may present one or more resolution options to the user at the interface. For example, the backend computer program may present an interface to confirm or deny a suspected fraud event, to provide authentication, etc. As another example, embodiments may provide an option to approve or reject a payment message. Embodiments may further provide a text box for the client to provide free text instructions (e.g., for sanctions dispositions).

In step 230, the backend computer program may receive a selection of one or more resolution options at the interface, and, in step 235, the backend computer program may execute the selected resolution option.

In one embodiment, if the resolution option is voice-based or gesture-based, embodiments may authenticate the user before executing the option. In one embodiment, the user may be authenticated before each action is performed.

Figure 3:
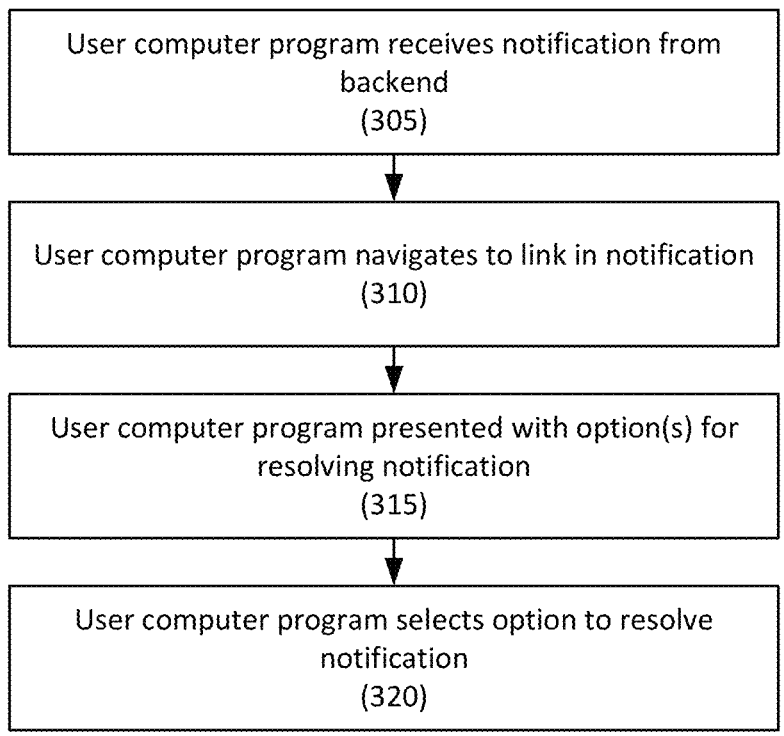
FIG. 3 depicts a method for automated notification and resolution of trigger events according to another embodiment.

Referring to FIG. 3, a method for automated notification and resolution of trigger events is disclosed according to another embodiment. In step 305, a user electronic device computer program may receive a notification from a backend. In one embodiment, the notification may include a file comprising a voice message or a link to a voice notification indicating the reason for the notification, such a trigger event being met. In one embodiment, the notification may further include a link to an interface hosted by the backend for resolving the issue.

In one embodiment, if not already authenticated, the user electronic device computer program may authenticate the user before providing access to the notification. For example, the user may be authenticated using biometrics (e.g., touch, voice, retina, etc.), by user id/password, by out-of-band authentication, etc.

In step 310, the user electronic device computer program may navigate to the link to retrieve the voice notification. In another embodiment, the user electronic device computer program may play the voice notification.

In step 315, the user electronic device computer program may be presented with the option(s) for resolving the notification, such as confirming or denying a suspected fraud event, providing authentication, etc.

In step 320, using the user electronic device computer program, the user may select an option for the backend computer program to execute to resolve the notification. For example, the user may request that a colleague in the office, an assistant, an agent, etc. be contacted to resolve the notification, may validate any requested information when available (e.g., has a network connection), may revert by email, text, phone, etc. Any other suitable actions may be taken as is necessary and/or desired.

Although several embodiments have been disclosed, it should be recognized that these embodiments are not exclusive to each other, and certain elements or features from one embodiment may be used with another embodiment.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor. As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processors and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communication technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated notification and resolution of trigger events, comprising:
    monitoring, by a backend computer program, an account for a trigger condition;
    generating, by the backend computer program, a voice notification in response to the trigger condition being met;
    communicating, by the backend computer program, the voice notification to an electronic device associated with the account and a link to a network location to resolve the trigger condition;
    presenting, by the backend computer program and at the network location to resolve the trigger condition, one or more resolution options;
    receiving, by the backend computer program and at the network location to resolve the trigger condition, a selection of one of the one or more resolution options, wherein the selection is received when a data connection between the electronic device and the backend computer program is unavailable, and communicated to the backend computer program when the data connection is restored; and executing, by the backend computer program, the selected resolution option.

2. The method of claim 1, wherein the trigger condition comprises an account balance falling below a threshold, a potential fraud event, or an authentication event.

3. The method of claim 1, wherein the trigger condition comprises a key performance indicator breach.

4. The method of claim 1, wherein the trigger condition comprises a disposition of a sanctions hit.

5. The method of claim 1, wherein the voice notification is provided as a second link.

6. The method of claim 1, wherein the voice notification is provided as an in-application notification.

7. The method of claim 1, wherein the backend computer program receives the selected resolution option as a voice-based command or a gesture-based command.

8. The method of claim 1, further comprising:
authenticating, by the backend computer program, a user associated with the account.

9. A non-transitory computer readable storage medium, including instructions stored thereon, which when read and executed by one or more computer processors, cause the one or more computer processors to perform steps comprising:
monitoring an account for a trigger condition;
generating a voice notification in response to the trigger condition being met;
communicating the voice notification to an electronic device associated with the account and a link to a network location to resolve the trigger condition;
presenting, at the network location to resolve the trigger condition, one or more resolution options;
receiving, at the network location to resolve the trigger condition, a selection of one of the one or more resolution options, wherein the selection is received by the electronic device when a data connection is unavailable, and received when the data connection is restored; and
executing the selected resolution option.

10. The non-transitory computer readable storage medium of claim 9, wherein the trigger condition comprises an account balance falling below a threshold, a potential fraud event, or an authentication event.

11. The non-transitory computer readable storage medium of claim 9, wherein the trigger condition comprises a key performance indicator breach.

12. The non-transitory computer readable storage medium of claim 9, wherein the trigger condition comprises a disposition of a sanctions hit.

13. The non-transitory computer readable storage medium of claim 9, wherein the voice notification is provided as a second link.

14. The non-transitory computer readable storage medium of claim 9, wherein the voice notification is provided as an in-application notification.

15. The non-transitory computer readable storage medium of claim 9, wherein the selected resolution option is received as a voice-based command or a gesture-based command.

16. The non-transitory computer readable storage medium of claim 9, further including instructions stored thereon, which when read and executed by one or more computer processors, cause the one or more computer processors to authenticate a user associated with the account.

* * * * *